United States Patent
Buhlke et al.

(12) 
(10) Patent No.: US 6,572,360 B1
(45) Date of Patent: Jun. 3, 2003

(54) FOOD PATTY MOLDING APPARATUS

(75) Inventors: Dennis Buhlke, Chino Hills, CA (US); Gary Cowart, Stockbridge, GA (US); Henry Araujo, Rancho Cucamonga, CA (US); Jack Clemens, Fontana, CA (US)

(73) Assignee: Golden State Foods Corporation, Irvine, CA (US)

( * ) Notice: Subject to any disclaimer, the term of this patent is extended or adjusted under 35 U.S.C. 154(b) by 126 days.

(21) Appl. No.: 09/650,343

(22) Filed: Aug. 28, 2000

Related U.S. Application Data (63) Continuation-in-part of application No. 09/561,120, filed on Apr. 28, 2000, now abandoned.

(51) Int. Cl.$^7$ ................................................ A22C 7/00
(52) U.S. Cl. ...................... 425/572; 425/574; 425/575; 425/556
(58) Field of Search ................................ 425/572, 574, 425/575, 556; 426/513

(56) References Cited

U.S. PATENT DOCUMENTS

| | | | |
|---|---|---|---|
| 2,852,809 A | 9/1958 | Miles | |
| 2,942,987 A | 6/1960 | Beerend | |
| 3,241,178 A | * 3/1966 | Bridge, Jr. | ................... 425/572 |
| 3,654,665 A | 4/1972 | Holly | |
| 3,747,160 A | 7/1973 | Holly | |
| 3,750,232 A | 8/1973 | Holly | |
| 3,765,056 A | 10/1973 | Holly | |
| 3,851,355 A | 12/1974 | Hughes | |
| 3,887,964 A | 6/1975 | Richards | |
| 3,909,880 A | 10/1975 | Holly | |
| 3,940,217 A | 2/1976 | McCarthy | |
| 4,054,967 A | 10/1977 | Sandberg | |
| 4,097,961 A | 7/1978 | Richards | |
| 4,153,974 A | * 5/1979 | Holly et al. | ................... 425/572 |
| RE30,096 E | 9/1979 | Richards | |
| 4,182,003 A | 1/1980 | Lamartino | |
| 4,356,595 A | 11/1982 | Sandberg | |
| 4,418,446 A | 12/1983 | Sandberg | |
| 4,821,376 A | 4/1989 | Sandberg | |
| 4,872,241 A | 10/1989 | Lindee | |
| 4,975,039 A | 12/1990 | Dare | |
| 4,987,643 A | 1/1991 | Powers | |
| 4,996,743 A | 3/1991 | Janssen | |
| 5,037,350 A | 8/1991 | Richardson | |
| 5,149,298 A | 9/1992 | Lindee | |
| 5,618,571 A | 4/1997 | London | |
| 5,795,610 A | 8/1998 | London | |

\* cited by examiner

*Primary Examiner*—George C. Yeung
(74) *Attorney, Agent, or Firm*—Manatt, Phelps & Phillips, LLP (57) ABSTRACT

The present invention is an apparatus and method pertaining the food patty production. The present invention allows high output production of food product patties at reduced machine operating speeds. This is accomplished by effectively utilizing a mold plate with multiple rows of patty cavities. Thus, more patties can be molded at slower operating speeds. This aspect of the present invention reduces normal wear and tear on machines resulting in high efficiency output. The present invention operated at reciprocating frequencies lower than those used in machines known in the industry can potentially increase output by two-fold, or more. The present invention is also designed to produce patties of uniform size, weight and texture thereby promoting consistent cooking and food safety. This is accomplished by a (1) specified operation timing sequence and (2) custom designed fill slots which serve as a conduit between a food product source and a patty cavity. The apparatus is adaptable for use in standard food patty molding machines.

25 Claims, 15 Drawing Sheets

Fill plate under mold plate

Top View

FIG. 9a
Top View
Previous Art

FIG. 9b

| Pulse | Plunger Pressure | Mold Plate Position |
|---|---|---|
| 0 | No pressure | Mold plate in discharge position and begins gradually to move toward fill position |
| 199 | High pressure turned on Plunger moves forward | Mold plate in fill position, cavity filling begins |
| 310 | High pressure turned off | Mold plate in fill position; filling stopped |
| 355 | High pressure relief on Plunger moves back | Mold plate begins to move toward discharge position |
| 465 | High pressure relief off | Mold plate continues to move toward discharge position |
| 600 | No pressure | Mold plate in discharge position; knockout cups activated; patties discharged |

FIG. 10

FOOD PATTY MOLDING APPARATUS

This is a continuation-in-part of U.S. patent application Ser. No. 09/561,120, filed on Apr. 28, 2000 and now abandoned.

BACKGROUND OF THE INVENTION

1. Field of Invention

The present invention relates to a food patty molding apparatus and method designed to produce a high output of food patties of uniform size, weight and texture in an efficient, cost effective operation promoting consistent cooking and food safety.

2. Description of Prior Art

The processed food industry continues to seek tools and methods to produce food patties, such as for hamburgers, veggie burgers and other foods, more efficiently and in greater quantities. It is also desirable to produce patties that are uniform in size, weight and texture to promote consistent cooking and food safety. Another desirous quality in the food processing industry is to reduce the need and frequency of mechanical repairs.

In machines presently used in the food patty processing industry, mold plates with six cavities are used to form patties. Food product is directed through a single fill slot and into the cavities for shaping. The fill slot generally runs the length of the mold plate and supplies food matter to all six cavities. Attempts to include more than six mold cavities using this design has resulted in substantial excess food matter waste and irregular patty size, weight and texture. This is particularly true of attempts to design mold plates with more than one row of patty cavities. Typical problems include overlapping patties, excess food matter on patties known as "lips," patties made with insufficient food matter known as "partials" and irregularly formed patty sides referred to as "ragged edges." Accordingly, a solution for these problems is needed.

A number of inventions have attempted to address some of these problems, but none has succeeded in overcoming all these limitations in one invention. For example, three patents issued to Holly address some, but not all, of the above problems. In Holly, U.S. Pat. Nos. 3,747,160, 3,750,232, and 3,765,056, a molding apparatus having a sliding plate containing mold openings is disclosed. The plate alternates between a food filling phase and a patty discharging phase, which is accomplished by knock-out rings. While the Holly references address the goal of increased patty output, these patents fail to address machine efficiency problems. Nor do the Holly references specifically address patty size, weight and texture issues.

In Sandburg, et al., U.S. Pat. No. 4,356,595, patty size, weight and texture is referenced, but not patty output and machine efficiency. Nor is the efficient multiple row patty cavities mold plate utilized in these patents. The same is true in Sandburg, U.S. Pat. No. 4,821,376. In Lindee, U.S. Pat. No. 4,872,241, double row patty mold plates are used in conjunction with shear blades which control patty shape. However, Lindee fails to address other limitations discussed above. Currently, double row mold plates are used in the industry for small patty sizes, but not for larger sized so called "10-1" patties (i.e. 10 equal-sized patties made from one pound of food matter).

Another limitation not addressed in the prior art is that of machine wear and tear. It is estimated that connector rods, used to reciprocate and cushion the mold plate, are serviced approximately every ninety days during normal use. The cost of a connector rod is approximately $1,500.00. This cost in addition to related repairs and down time, costs are serious problems, not addressed in any of the prior art above. A further limitation is that much of the prior art claims entire machines rather than less expensive, and more versatile adaptive tooling devices.

In view of the foregoing, there is a need for a food patty molding apparatus and method that overcomes the deficiencies of the prior art.

SUMMARY OF THE INVENTION

The present invention is an apparatus and method to produce an increased output food matter patties with a reduction of normal machinery wear and tear. Rather than require a new patty forming machine, the present invention is a tooling improvement which can be adapted to machines already in use.

The present invention comprises a mold plate with two or more rows of patty cavities. This multiple row configuration can potentially double, or more, the output capacity of machines used in the industry. The preferred embodiment illustrates two rows of large "10-1" patties.

The mold plate reciprocates between a filling position and a discharging position. When the mold plate is in the filling position, the patty cavities are individually filled with food product. When the mold plate is in the discharging position, customized knock-out cups simultaneously pass through patty cavities and dislodge the formed food matter patties onto a conveyor belt for further processing.

Positioned between the food source and the mold plate is a fill slot plate. According to one embodiment of the present invention, the fill slot plate contains a plurality of fill slots in two or more rows, each of which is designed to correspond to an individual patty cavity. Food product is compressed by plungers and pushed through the fill slots and into individual patty cavities. The fill slots in the present invention are positioned, angled and shaped in a manner to ensure proper food matter flow into the patty cavity resulting in consistent patty size, weight and texture. A custom breather plate is positioned adjacent to the mold plate and opposite the fill slot plate. The breather plate is designed to evacuate air from the patty cavities and collect and route excess food matter back to a food source.

According to an alternate embodiment of the present invention, the fill slot plate contains a plurality of fill slots in a single row, each of which corresponds to an individual patty cavity of one row of patty cavities. According to this embodiment, each fill slot contains sufficient food product to fill two or more patty cavities. Thus, food is compressed by plungers and pushed through the fill slots and into individual patty cavities in a first row. The mold plate then repositions itself such that the fill slots are aligned with the second row of individual patty cavities and the plunger once again compresses food and pushes the food out through the fill slots into the individual patty cavities in the second row.

In addition to increased patty output by virtue of its multiple row configuration, the present invention is designed to utilize slower machine operating speed. This results in significantly less wear and tear on the patty forming machines. In presently known machines, connector rods are used to reciprocate and cushion the mold plate. Under normal use, connector rods are serviced approximately every ninety days at a cost of $1,500 per unit. In addition to the costs of replacement, there are associated repair costs as well as machine down time. These inefficiencies can be essentially cut in half, or more, with the present invention due to its ability to operate at slower speeds without compromise to output.

As discussed above, typical machines used in the industry use plungers to route food matter from a source, through fill slots and into patty cavities. Each plunger is activated by a 4" or greater hydraulic cylinder in standard machines. However, the preferred embodiment of the present invention uses a faster, more efficient 3¼" cylinder which enables sufficient compression to fill twelve or more patty cavities.

In a preferred embodiment, the mold plate reciprocates at 65 strokes per minute, some 30% lower than the typical 90 to 95 strokes per minute used in currently available machines. Despite this reduction in stroke frequency, patty output is nonetheless increased. The present invention operating at 65 strokes per minute has increased performance as compared to machines currently used in the industry operated at top frequencies of 95 strokes per minute. Further, most machines used in the industry, such as the Formax 26 machine manufactured by Formax, Inc. of Mokena, Ill., have maximum stroke frequencies of 95 to 97 strokes per minute. The present invention can be operated at stroke frequencies faster than 65 strokes per minute, resulting in an equivalent of potentially up to 190 strokes per minute rate, or better, as compared with machines presently used in the food patty industry.

In a preferred embodiment, custom operational programming software orchestrates the timing of plunger compression and plunger release in the patty manufacturing process. The programming in the preformed embodiment of the present invention greatly reduces typical problems associated with the food patty manufacturing such as overlapping patties, "lips," "rugged edges," and "partials" thereby promoting consistent cooking and food safety.

The present invention may be better understood by referring to the following detailed description, which should be read in conjunction with the accompanying drawings. The detailed description of a particular preferred embodiment, described below, is intended to be a particular example, and not a limitation.

BRIEF DESCRIPTION OF THE DRAWINGS

The attached drawings illustrate the preferred embodiment of the invention. In such drawings.

DETAILED DESCRIPTION OF THE INVENTION

Figure 1:
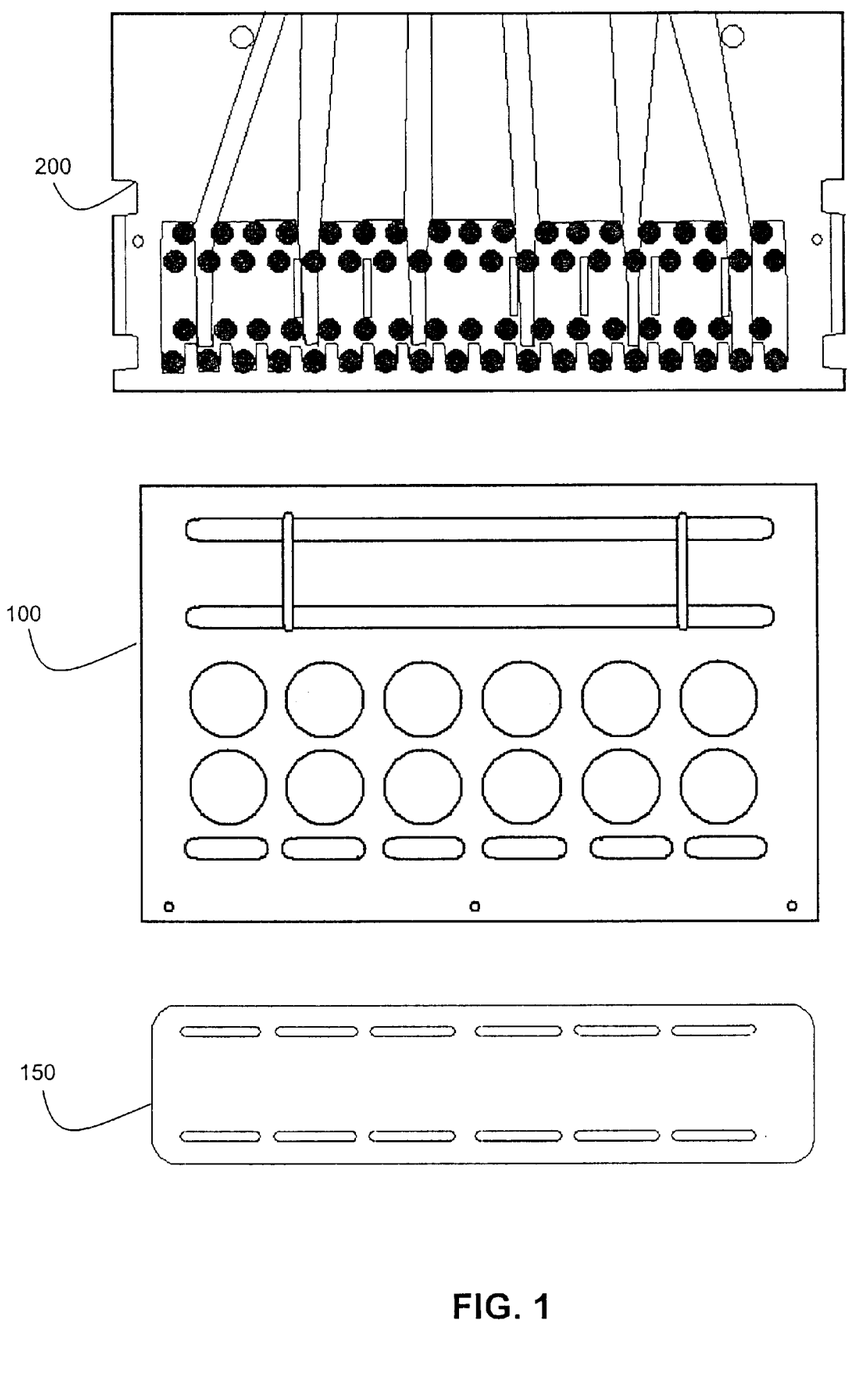
FIG. 1 is an exploded view of one embodiment of the molding apparatus.
Figure 1A:
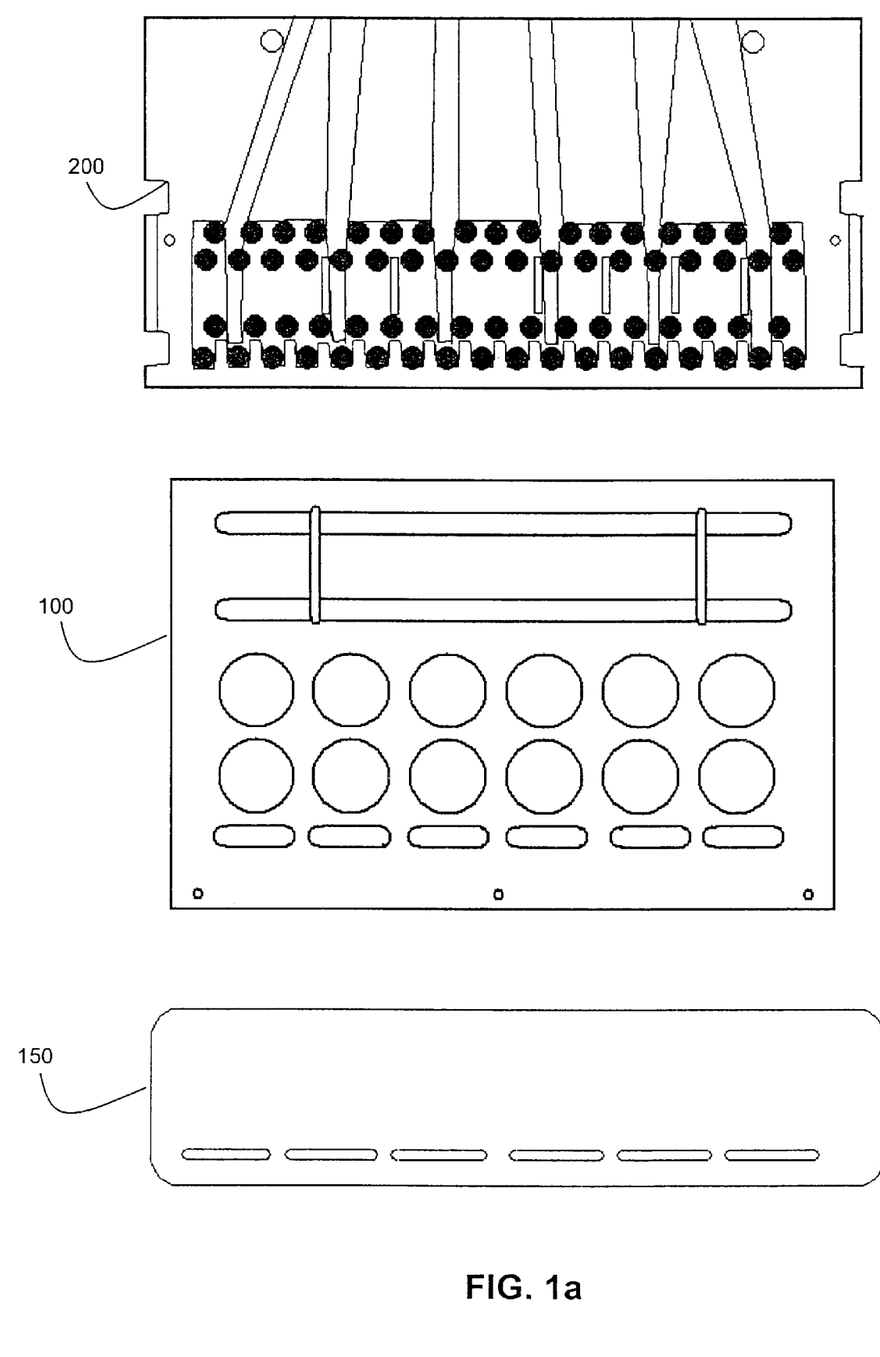
FIG. 1a is an exploded view of an alternate embodiment of the molding apparatus.

FIG. 1 illustrates one embodiment of the food patty molding apparatus in an exploded view, having two rows of fill slots on a fill plate. FIG. 1a illustrates an alternative embodiment of the food patty molding apparatus in an exploded view, having one row of fill slots on a fill plate.

Figure 2:
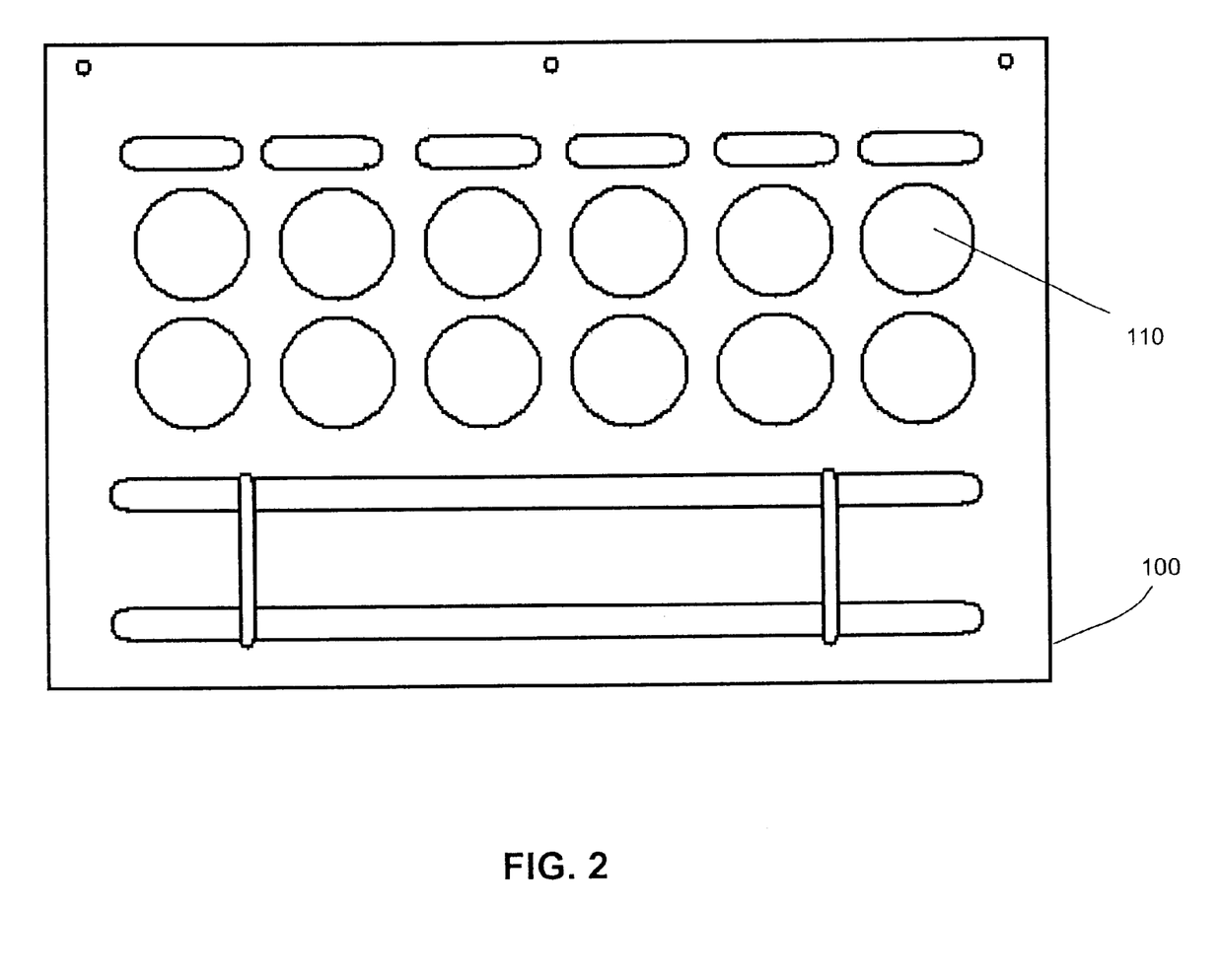
FIG. 2 is a top view of the mold plate illustrating two rows of patty cavities according to one embodiment of the present invention.

FIG. 2 illustrates a mold plate (100) having two sets of patty cavities (110). The mold plates is reciprocated between a food filling system and a patty dislodging system in a food patty molding machine such as the Formax 26 machine manufacturer by Formax, Inc. of Mokena, Ill. The preferred embodiment enables twelve "10-1" sized patties to be formed simultaneously.

Figure 3:
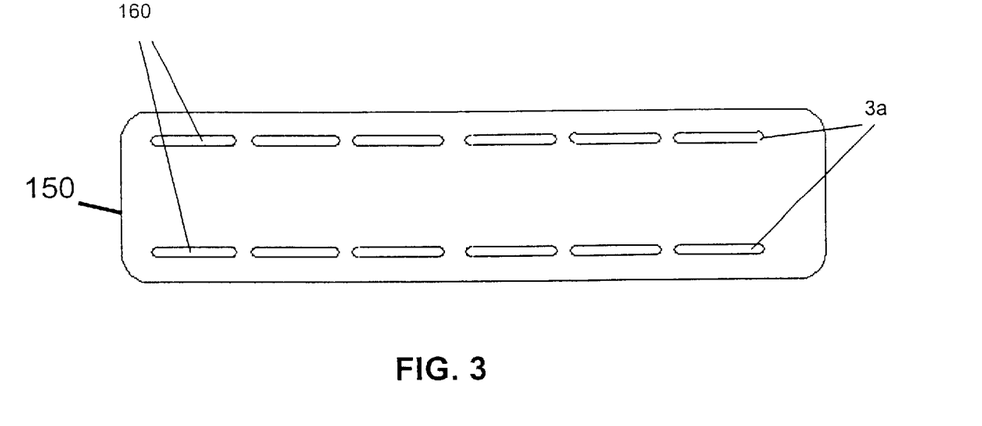
FIG. 3 is a top view of the slot plate illustrating the shape and positioning of the fill slots, each of which corresponding to a particular patty cavity according to one embodiment of the present invention.
Figure 3A:
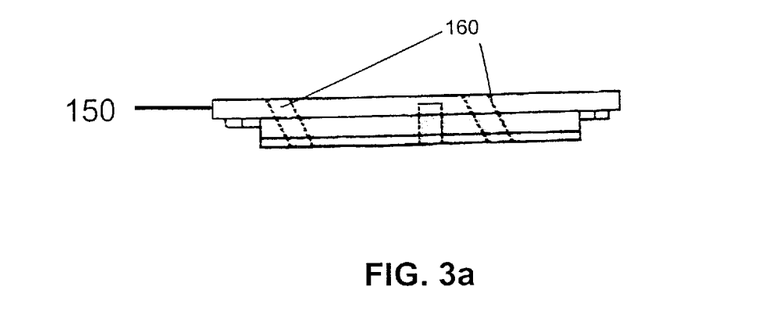
FIG. 3a is a cross-section elevation view of the slot plate illustrating the angular nature of the fill slots.
Figure 3B:
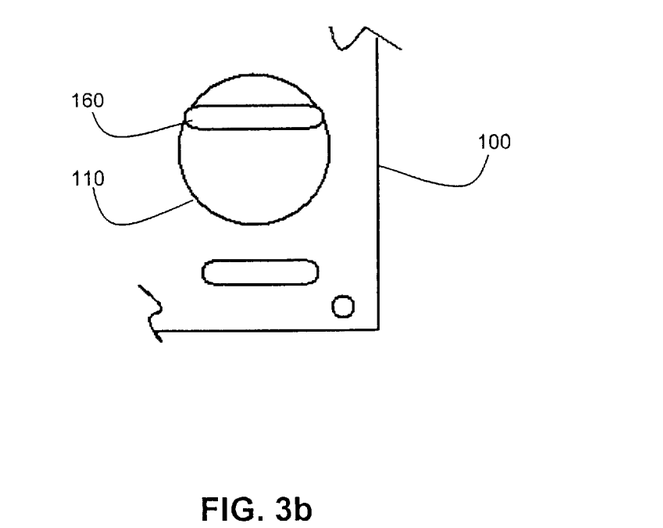
FIG. 3b is a magnified top view of a fill slot superimposed by a patty cavity according to one embodiment of the present invention.

FIG. 3 illustrates one embodiment of the present invention. As illustrated, the fill slot plate (150) which is aligned with the mold plate (100) when the mold plate was in filling position. A plurality of fill slots (160) located in two rows on the fill slot plate (150) are designed to correspond to an individual patty cavity (110) on the mold plate (100). The plurality of fill slots (160) allow entry of food material into each respective patty cavity (110). In a preferred embodiment, twelve fill slots (160) with twelve corresponding patty cavities (110) are shown. Each fill slot (160) is slanted as shown on FIG. 3a. Further, each fill slot (160) has rounded ends and is aligned to be at one end of the patty cavity as shown in FIG. 3b (110). This design allows food matter to enter the patty cavity (110) smoothly and across the patty cavity (110) ensuring uniform patty size, weight and texture and resulting in reduced excess food matter.

Figure 4:
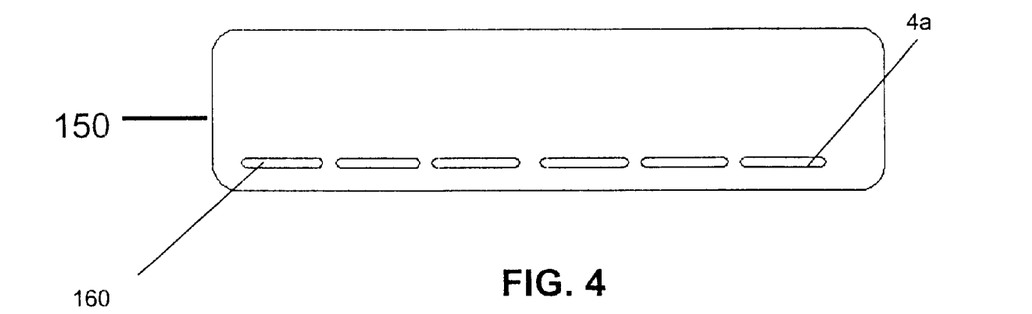
FIG. 4 is a top view of the slot plate illustrating the shape and positioning of the fill slots, each of which corresponding to a particular patty cavity in one row of patty cavities according to an alternate embodiment of the present invention.
Figure 4A:
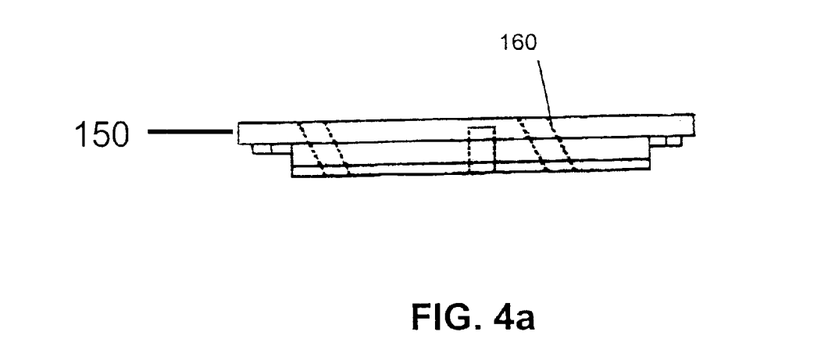
FIG. 4a is a cross-section elevation view of the slot plate illustrating the angular nature of the fill slots.
Figure 4B:
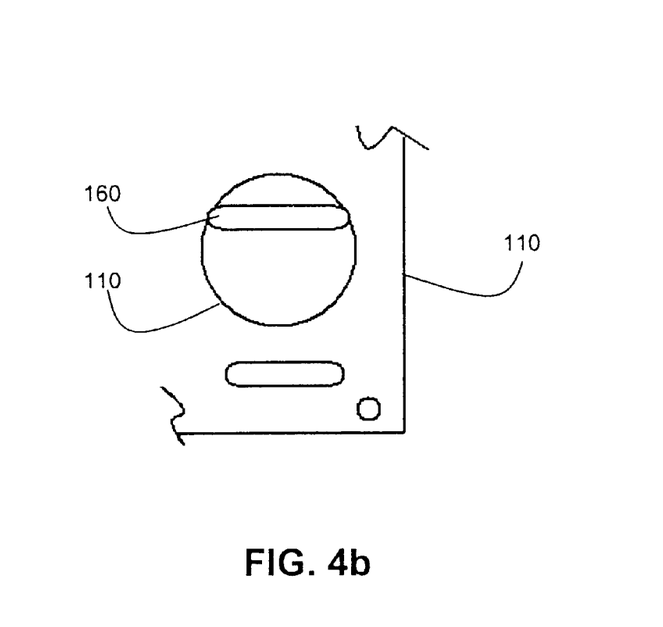
FIG. 4b is a magnified top view of a fill slot superimposed by a patty cavity according to an alternate embodiment of the present invention.

FIG. 4 illustrates an alternate embodiment of the present invention. As illustrated, the fill slot plate (150) is aligned with the mold plate (100) when the mold plate was in filling position. A plurality of fill slots (160) located in one row on the fill slot plate (150) are designed to correspond to individual patty cavities (110) in one row of on the mold plate (100). The plurality of fill slots (160) first allow entry of food material into each respective patty cavity (110) in a first row. The mold plate then repositions itself such that the plurality of fill slots are aligned with each respective patty cavity (110) in the second row of said mold plate (100) and may allow entry of food material into each respective patty cavity (110) in the second row. As in the previous embodiment, each fill slot (160) is slanted as shown on FIG. 4a. Further, each fill slot (160) still has rounded ends and is aligned to be at one end of the patty cavity as shown in FIG. 4b (110). This design allows food matter to enter the patty cavity (110) smoothly and across the patty cavity (110) ensuring uniform patty size, weight and texture and resulting in reduced excess food matter.

Figure 5:
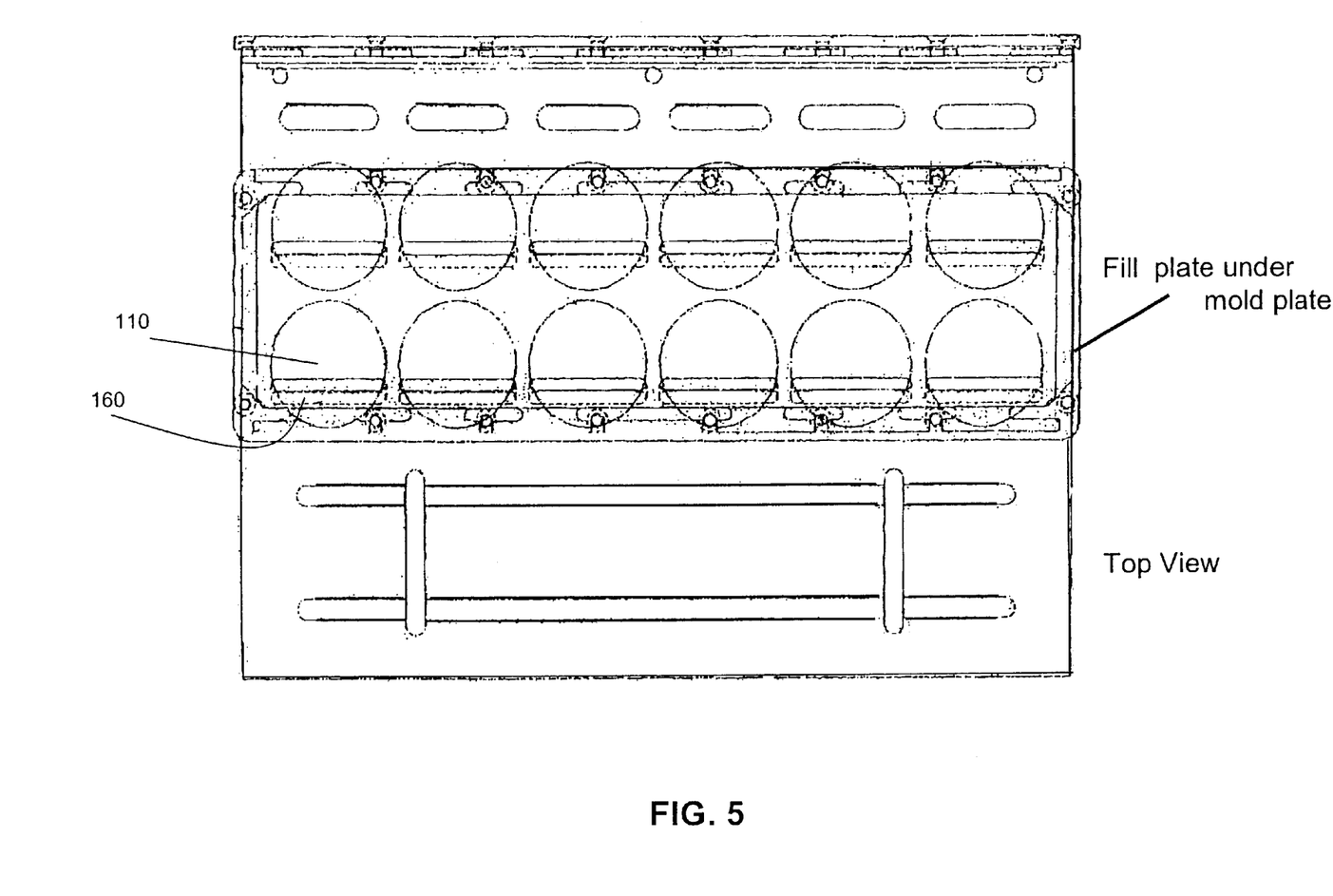
FIG. 5 is a top view composite drawing showing the mold plate aligned with the fill slot plate according to one embodiment of the present invention.
Figure 6:
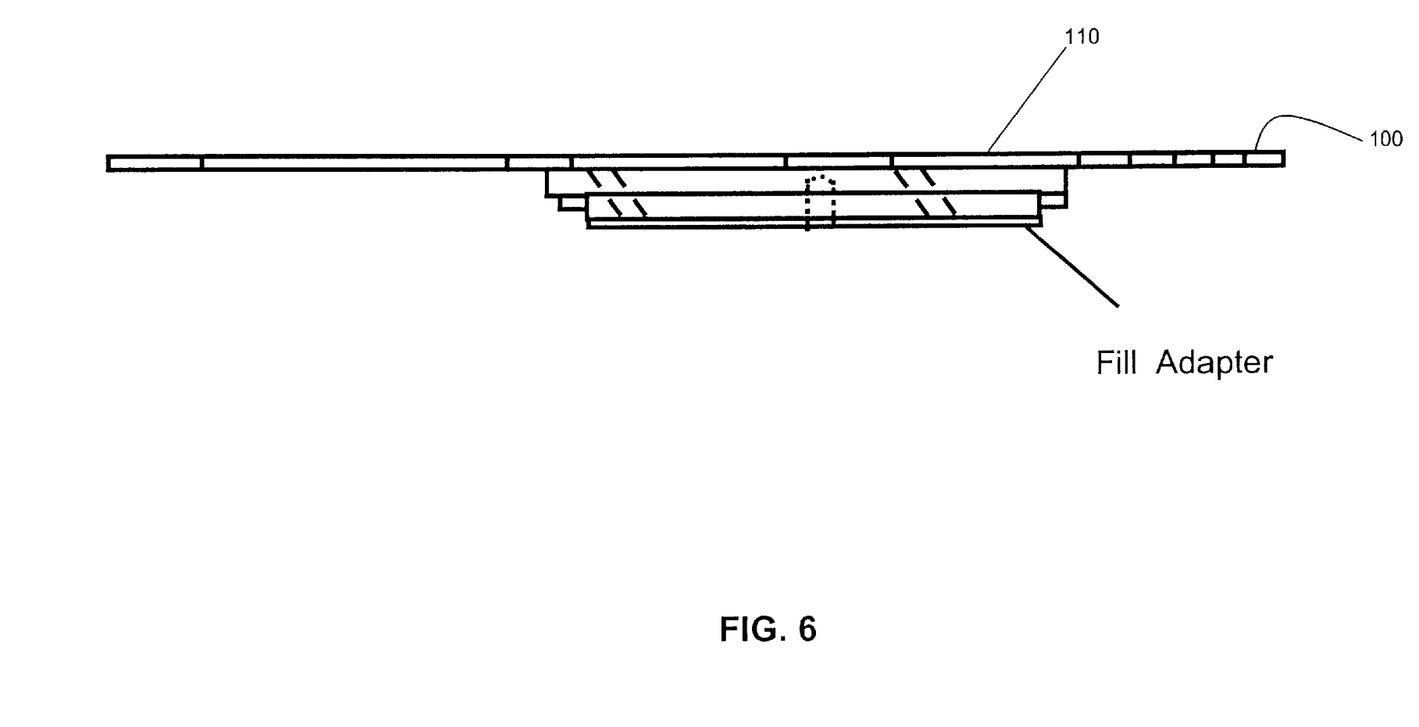
FIG. 6 is a cross-section elevation view of the mold plate and fill plate aligned together according to one embodiment of the present invention.

A top view illustrating the mold plate (100) aligned with the fill slot plate (160) is shown in FIG. 5. According to this embodiment, as food product passes through the underlying fill slots (160), shown in dotted lines, entering the patty cavities (110) as discussed above. FIG. 6 illustrates a cross section of the aligned mold plate (100) and fill slot plate (150) of one embodiment of the present invention. The angular fill slots (160) are indicated in dotted lines.

Figure 5A:
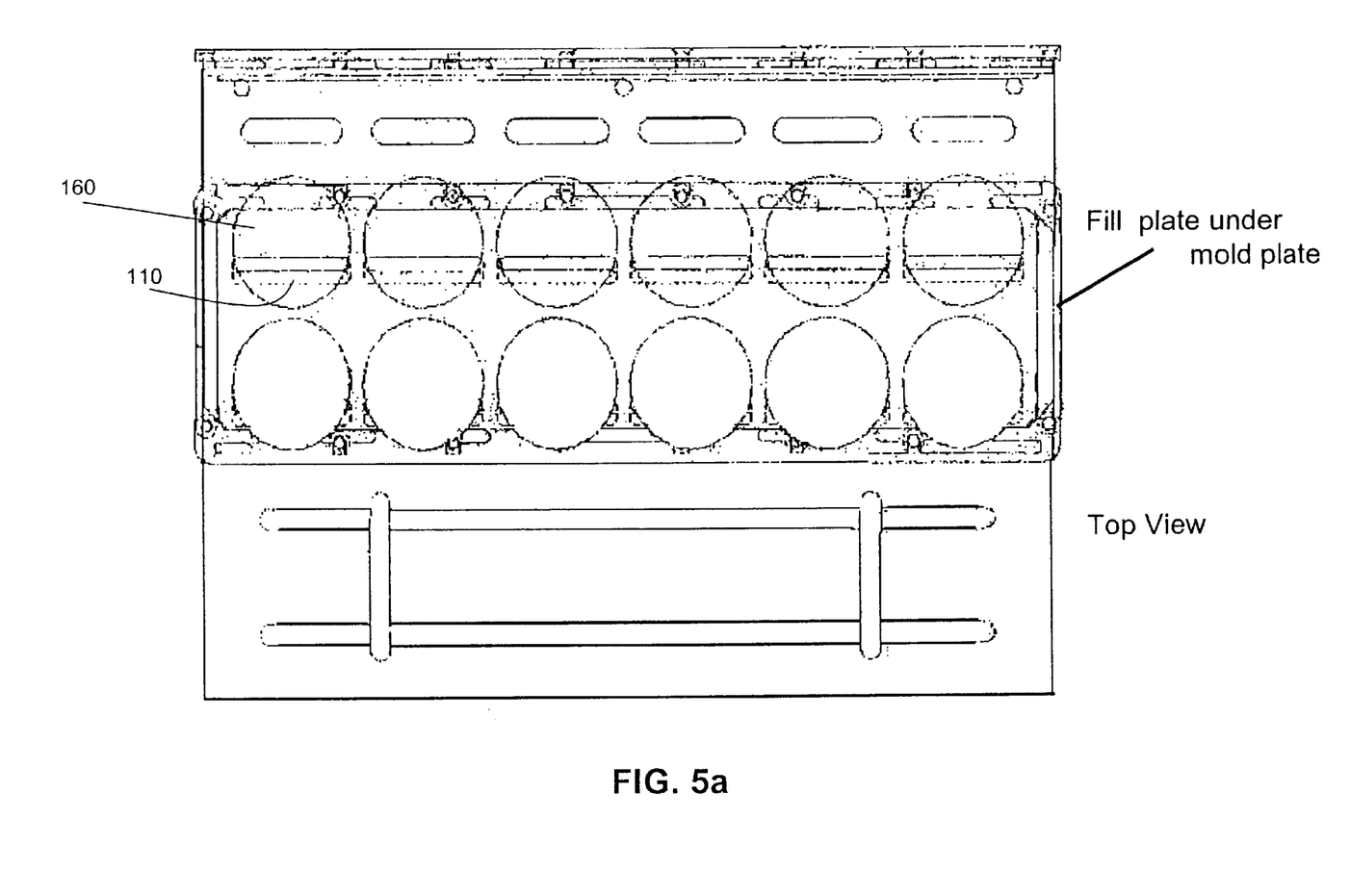
FIG. 5a is a top view composite drawing showing the mold plate aligned with the fill slot plate according to an alternate embodiment of the present invention.
Figure 5B:
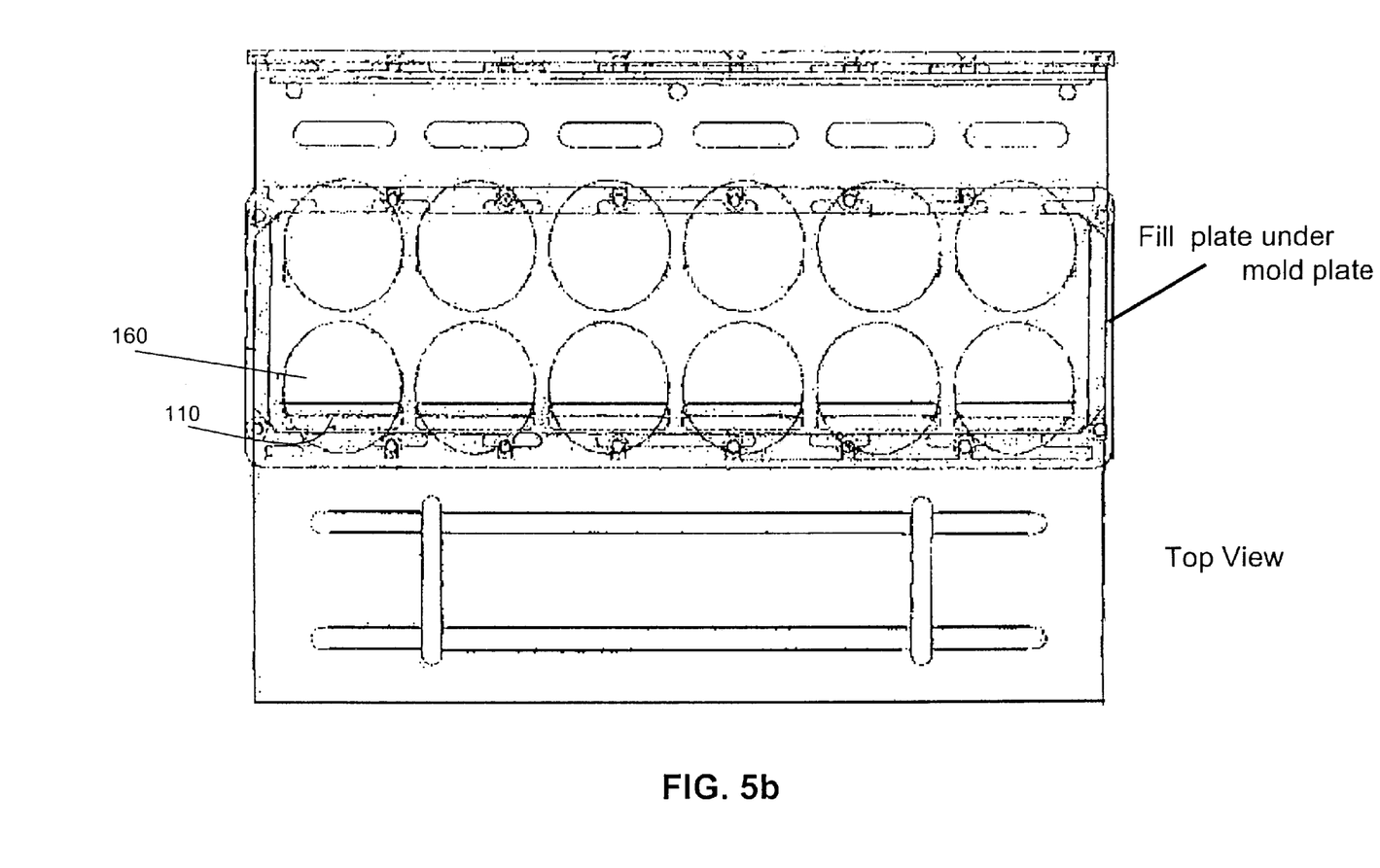
FIG. 5b is a top view composite drawing showing the mold plate aligned with the fill slot plate in a second position according to the alternate embodiment of the present invention.
Figure 6A:
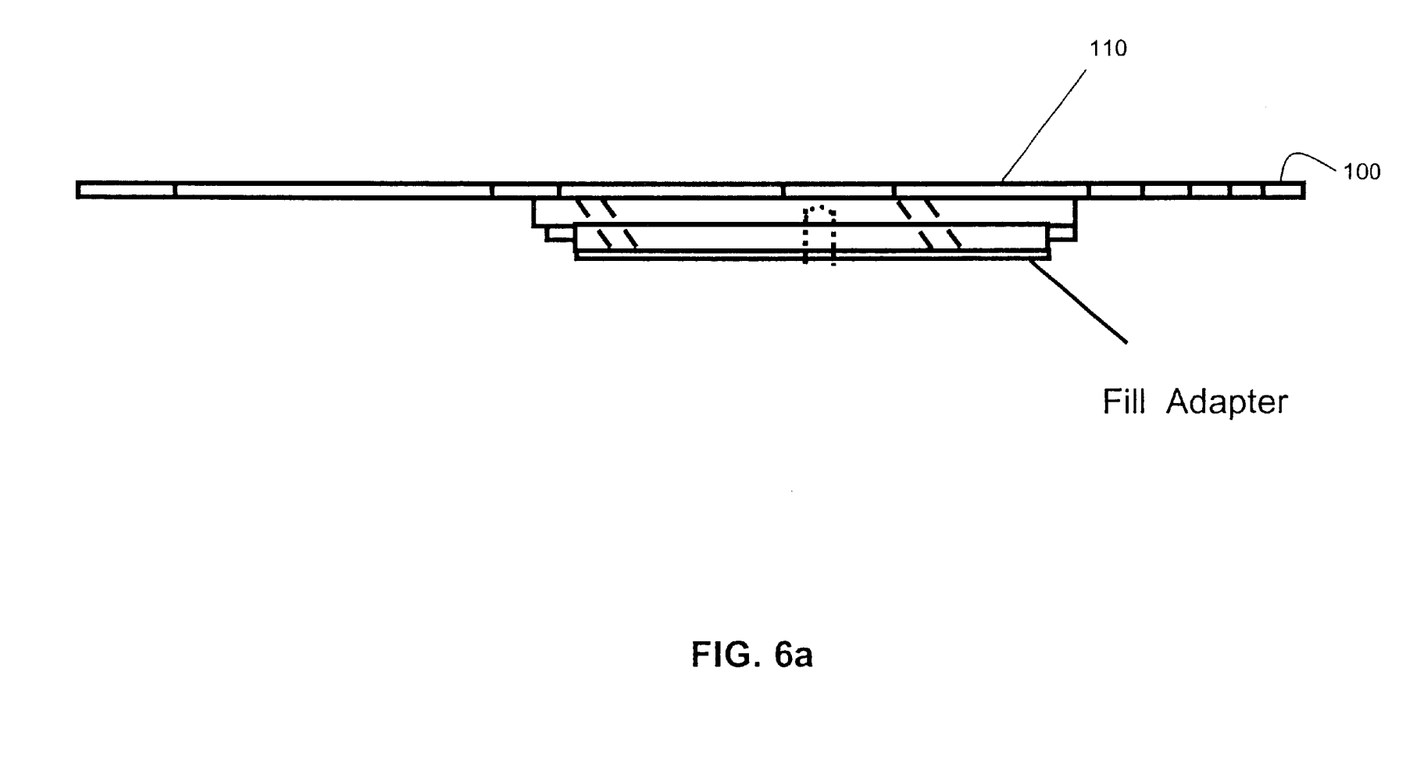
FIG. 6a is a cross-section elevation view of the mold plate and fill plate aligned together according to an alternate embodiment of the present invention.

An alternate embodiment of illustrated in FIGS. 5a and 5b. According to this embodiment, a fill slot plate (160) having a single row of fill slots is aligned with one row of cavities on the mold plate (100). As food product passes through the underlying fill slots (160), shown in dotted lines, the food product enters the first row of patty cavities (110) as illustrated in FIG. 5a. The mold plate (100) then repositions itself such that the fill slots (160) are aligned with the second row of cavities on the mold plate (100). As food product passes through the underlying fill slots (160), shown in dotted lines, the food product enters the second row of patty cavities (110) as illustrated in FIG. 5b. FIG. 6a illustrates a cross section of the aligned mold plate (100) and fill slot plate (150) of the alternate embodiment of the present invention. The angular fill slot (160) is indicated in dotted lines.

Figure 7:
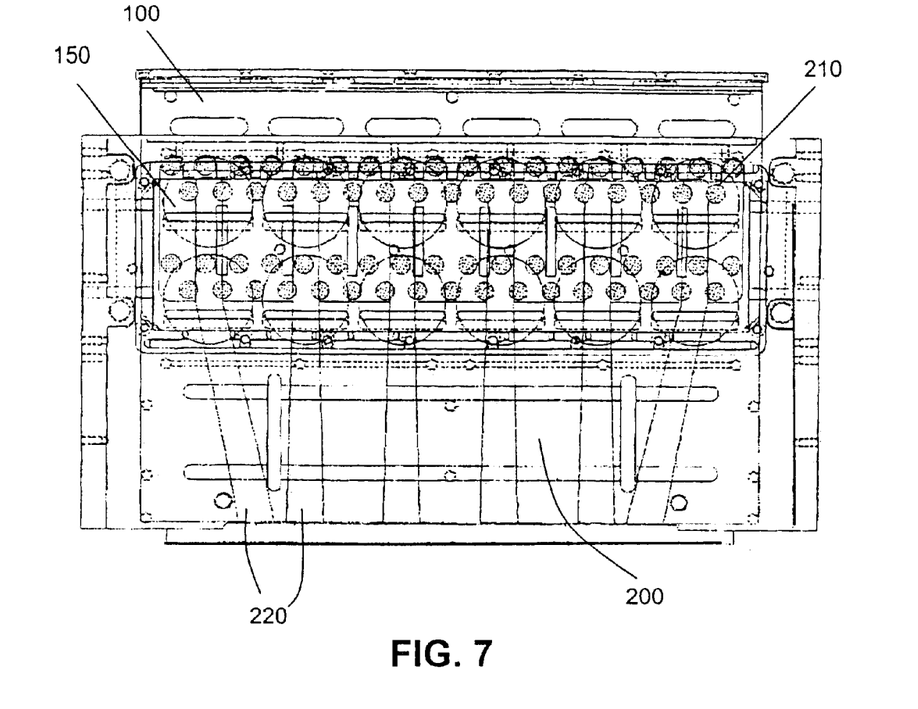
FIG. 7 is a composite top view of the mold plate, fill plate and breather plate aligned together.
Figure 8:
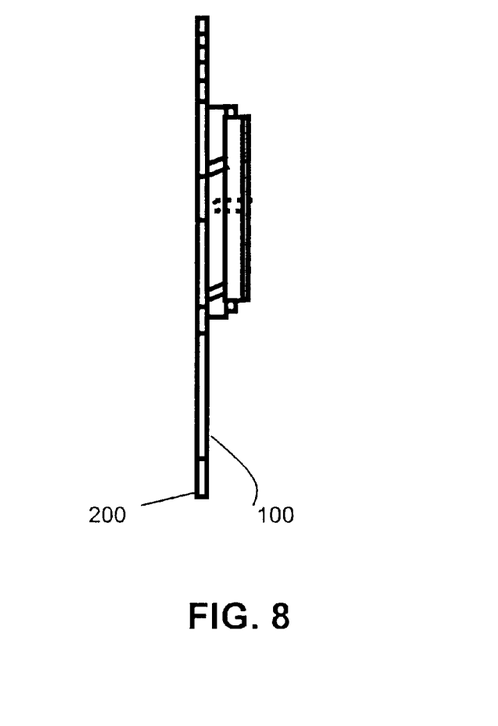
FIG. 8 is a cross-section elevation view of the mold plate, fill plate and breather plate in alignment.

FIG. 7 illustrates a breather plate (200) aligned with the mold plate (100), and opposite the fill slot plate (150). The breather plate (200) contains various ports (210) which allow evacuation of air and accumulation of excess food matter from the filled patty cavities (110). The excess food matter is then directed by channels (220) back to a food product source. In the preferred embodiment, each channel (220) services multiple patty cavities (110). FIG. 8 illustrates a cross section of the aligned mold plate (100), fill slot plate (150) and breather plate (200).

Figure 9:
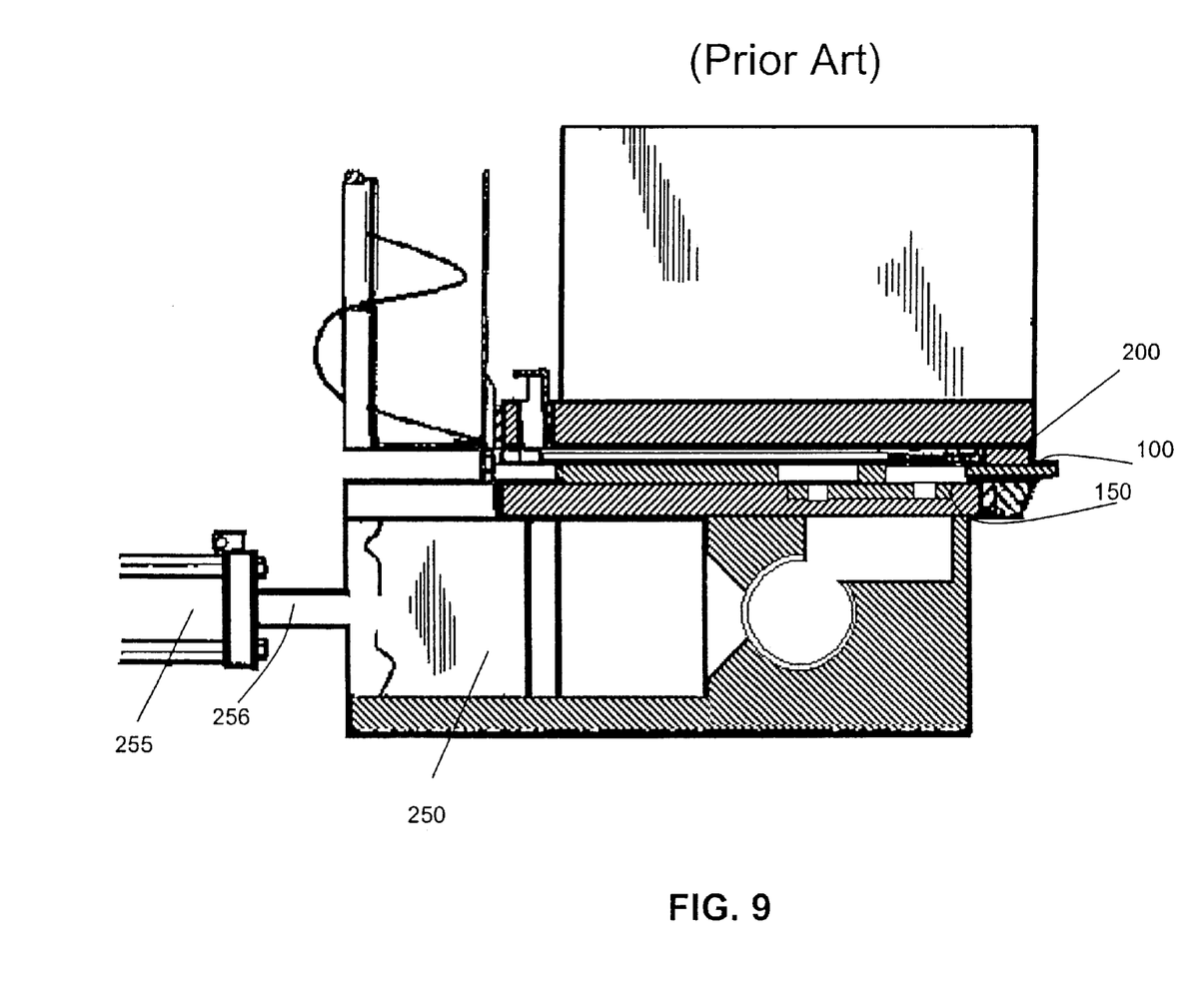
FIG. 9 is a sectional side elevation of a typical food patty mold machine.
Figure 9A:
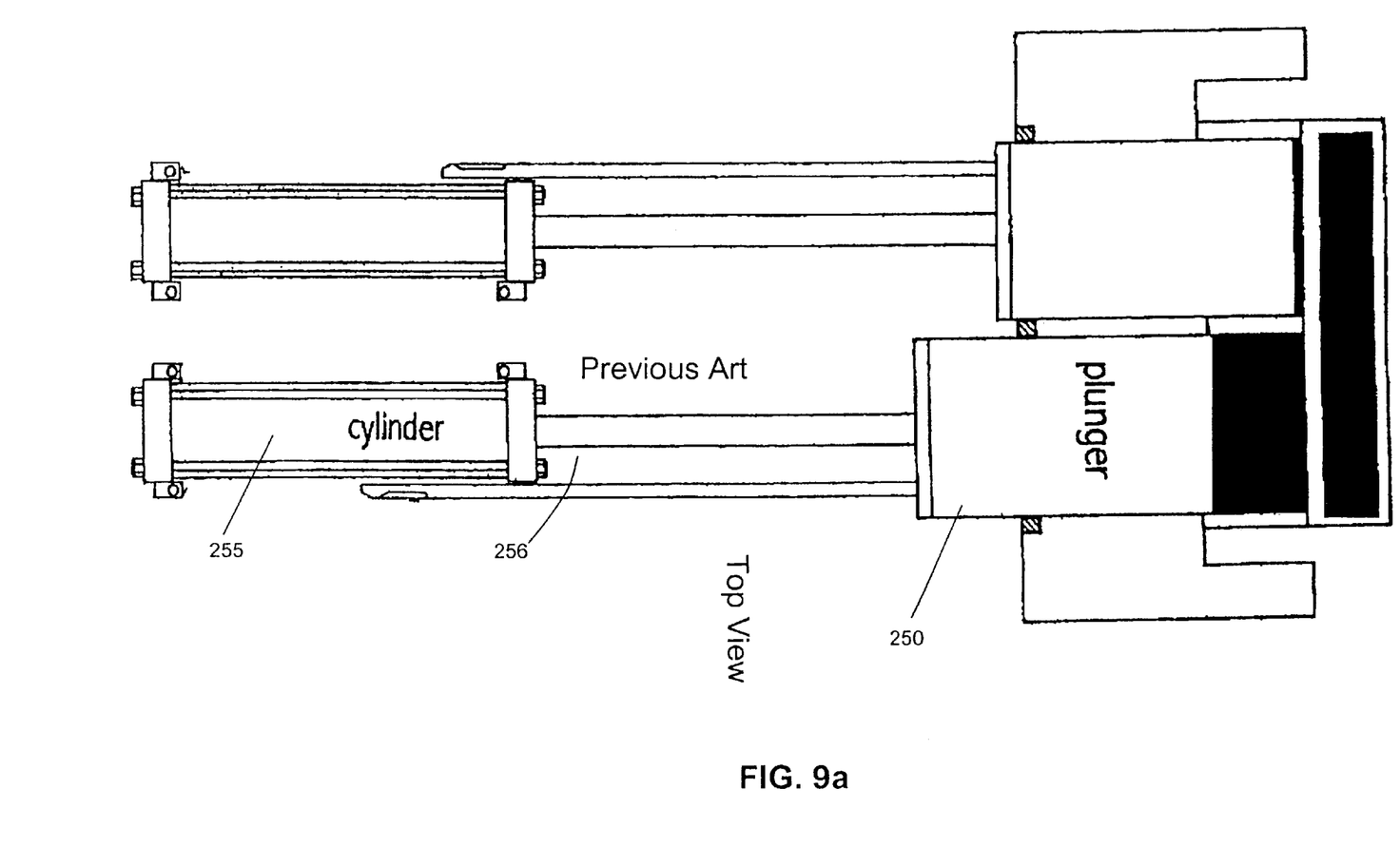
FIG. 9a is an overhead cross section view of a typical food patty mold machine.
Figure 9B:
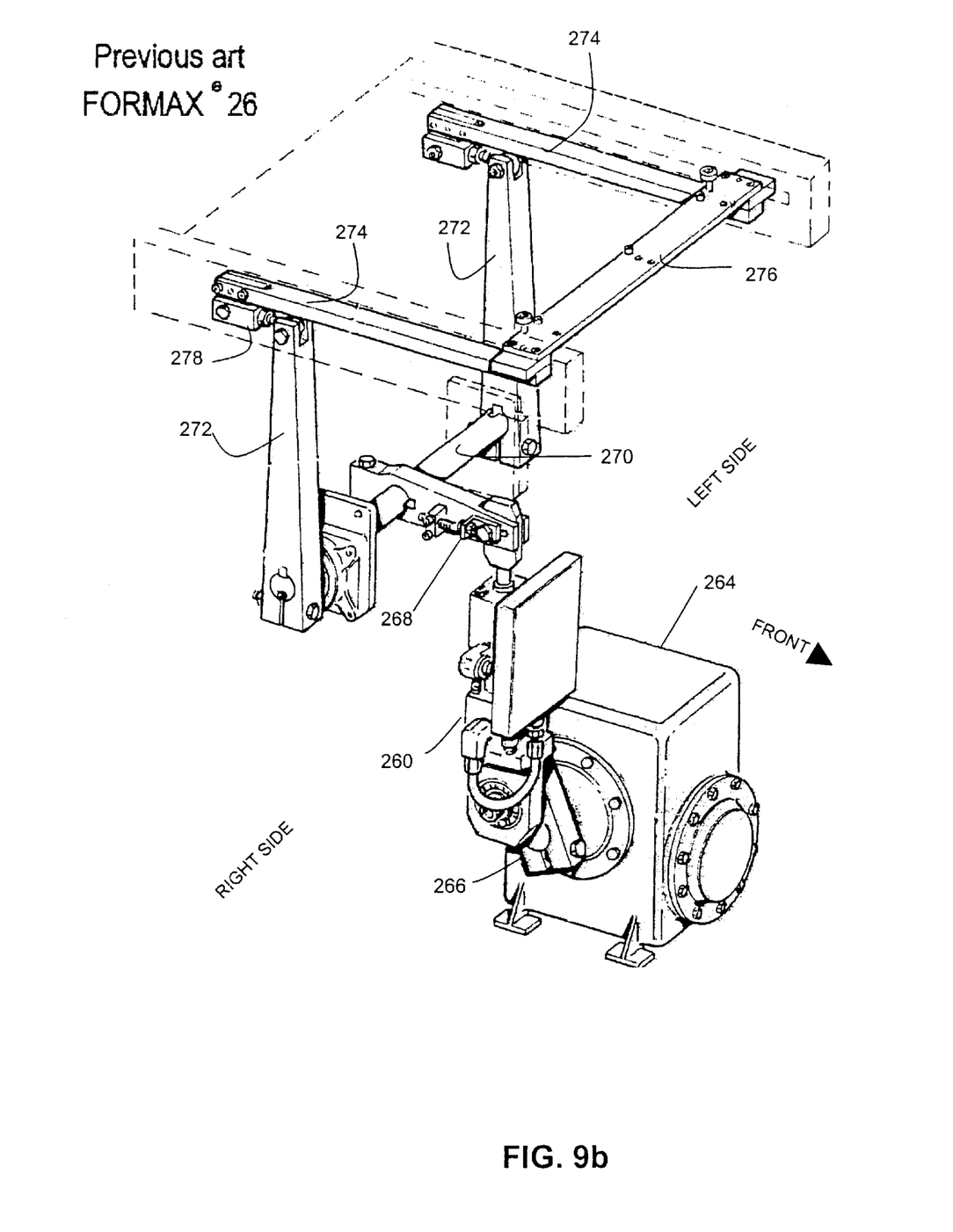
FIG. 9b is the reciprocating system of a typical food patty mold machine.

FIG. 9 shows the Formax 26 food patty molding machine used typically in the industry. Plungers (250) operated by hydraulic cylinders (255) and piston rod assemblies (256) are used to route food matter through the fill slots (160) and into the respective patty cavity (110). FIG. 9a is a top view of a typical patty molding machine. The mold plate (100) is reciprocated by a reciprocating assembly (258) as shown in FIG. 9b. A connector rod (260) causes the mold plate (100) to reciprocate between the fill position and discharge position.

In a typical patty molding machine, power flows to a gear box (264) which rotates a crank arm (266). The rotation of the crank arm (266) results in linear, up and down displacement of the connector rod (260). The connector rod (260) is attached to a short rocker arm (268), which is in turn attached to a rocker arm drive shaft (270). The linear movement of the connector rod (260) causes the short rocker arm (268) to pivot about the axis of the rocker arm drive shaft (270). The rocker arm drive shaft (270) is mechanically connected to a pair of long rocker arms (272) which are in turn connected to a pair of mold plate drive arms (274). Rotation of the short rocker arm (268) about the axis of the rocker arm drive shaft (270) causes the long rocker arms (272) to reciprocate back and forth. A drive bar (276) facilitates attachment of the mold plate (100) to the mold plate drive arms (274).

In a preferred embodiment, the mold plate reciprocates at 65 strokes per minute, rather than the typical 90–95 strokes per minute found in the industry. The present invention reciprocating at 65 strokes per minute is equivalent to or better than machines currently used in the industry which operate at top reciprocation frequencies of 95 strokes per minute. Most machines used in the industry, such as the Formax 26, have maximum stroke frequencies of 95 to 97 strokes per minute. The present invention operated at a potential 95–97 strokes per minute would be equivalent to a known machine operated at (an unachievable) 190 strokes per minute.

The preferred embodiment utilizes a 3¼" hydraulic cylinder (255) to displace the plungers (250), rather than the standard 4" cylinder used in current machines. The 3¼" hydraulic cylinder (255) is an improvement which allows the plungers to operate faster and route more food matter to the multiple row patty cavities (110) as compared with currently used machines. Adequate food matter for twelve or more patty cavities (110) is provided at each time the mold plate is in the fill position. According to one embodiment of the present invention, the food matter for all twelve or more patty cavities (110) are discharged into the cavities at the same time. According to an alternate embodiment, the food matter is discharged first into a first row of six or more cavities and then discharged into a second row of six or more cavities.

The present invention is also designed to utilize lower reciprocation frequencies resulting in significantly less wear and tear to the connector rods (260). Under normal use with presently known machines, connector rods (260) are serviced approximately every ninety days, and cost of replacement is $1,500 per unit. In addition to the costs of replacement, there are associated repair costs as well as machine down time which occur. These inefficiencies can be cut in half, or more, with the present invention due to its ability to operate at slower reciprocating frequencies without compromise to output.

Figure 10:
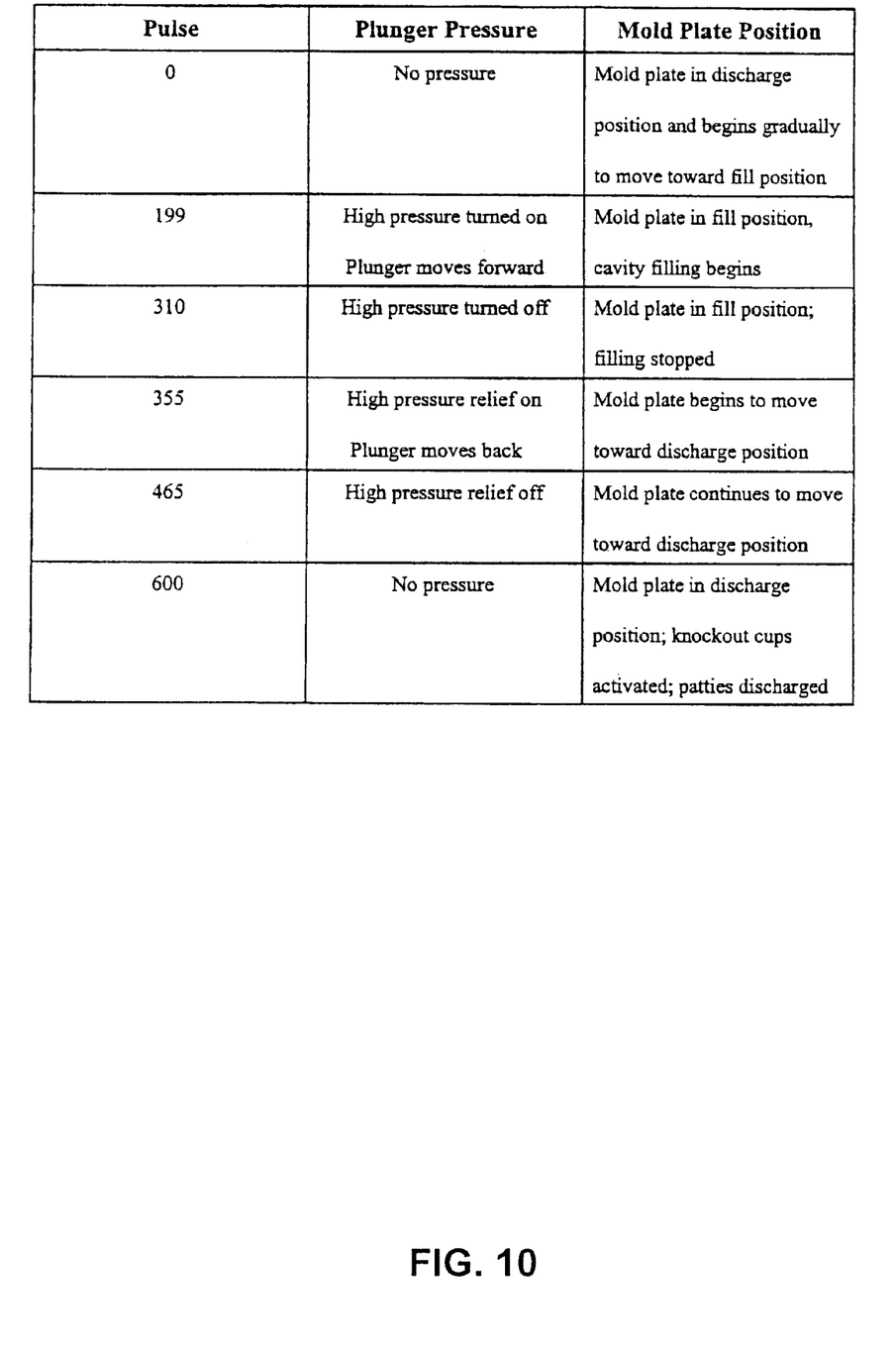
FIG. 10 is a diagram of the enabling operation timing of the present invention.

The efficient design of the fill slots (160) coupled with multiple row patty cavities (110) on the mold plate (100) results in a higher output of patties at a reduced reciprocative frequency. However, strict attention to the timing of when food product is compressed and released must be adhered. FIG. 10 illustrates the ideal operation timing sequence (in pulses) of the preferred embodiment. There are 600 pulses per minute. Proper patty cavity filling requires pressure be exerted and released at a specified rate. This specified rate is maintained and controlled by computer software in the preferred embodiment such that at least twelve (12) patty cavities are adequately filled. Further, common problems such as patty irregularity and overlapping are avoided by adhering to the disclosed timing sequence in the preferred embodiment.

We claim:

1. A food patty molding apparatus, comprising:
   a mold plate having a plurality of patty cavities arranged in at least two rows;
   a fill slot plate aligned with said mold plate, said fill slot plate having a plurality of fill slots, each of said plurality of fill slots corresponding to one of said plurality of patty cavities; and
   a food matter routing means which routes food matter from a food matter source through said plurality of fill slots and into said plurality of patty cavities to form uniform patties.

2. The apparatus of claim 1 further comprising:
   a means for reciprocating said mold plate between a filling position and a discharging position; and
   a plurality of knockout cups arranged in at least two rows whereby when said mold plate is in said discharging position, said food matter routing means ceases to operate and said plurality of knockout cups act to discharge formed patties from said plurality of patty cavities.

3. The apparatus in claim 1 wherein said food matter routing means includes a plunger operated by a hydraulic cylinder and piston rod assembly which applies and releases pressure to food matter from said food matter source.

4. The apparatus in claim 2 wherein said food matter routing means includes a plunger operated by a hydraulic cylinder and piston rod assembly which applies and releases pressure to food matter from said food matter source.

5. The apparatus in claim 2 where said means for reciprocating said mold plate is operate in a low frequency range of about 65 stroke per minutes.

6. The apparatus in claim 2 where said means for reciprocating said mold plate is operable in a high frequency range of about 90 to 97 strokes per minute.

7. The apparatus in claim 6 wherein said high frequency range is about 95 strokes per minute.

8. The apparatus in claim 4 further comprising a computer controller that controls said means for reciprocating said mold plate and said plunger operated by said hydraulic cylinder and piston rod assembly to cyclically operate as follows: Pulse 0—no pressure from said plunger, said mold plate is in said discharge position; Pulse 199—high pressure turned on, said lunger advances, said mold plate in said filling position, filling begins, Pulse 310—high pressure turned off, said patty cavities are filled, filling stops; Pulse 355—high pressure relief is turned on, said plunger retracts; Pulse 465—high pressure relief turned off, said mold plate moves toward said discharge position; Pulse 600—no pressure to said plunger, said mold plate is in said discharge position and patties are discharged by said knockout cups.

9. The apparatus in claim 1, wherein said plurality of patty cavities form 10-1 size patties.

10. The apparatus in claim 3 wherein said hydraulic cylinder and piston rod assembly comprises a 3¾" cylinder.

11. The apparatus in claim wherein said hydraulic cylinder and piston rod assembly comprises a 3¼" cylinder.

12. The apparatus in claim 1, wherein said plurality of fill slots are angularly oriented.

13. The apparatus in claim 5 wherein said plurality of fill slots are angularly oriented.

14. The apparatus in claim 1 wherein said plurality of patty cavities have an outer end, said plurality of fill slots being positioned at said outer end of said plurality of patty cavities.

15. The apparatus in claim 5 wherein said plurality of patty cavities have an outer end, said plurality of fill slots positioned at said outer end of said plurality of patty cavities.

16. The apparatus in claim 2 further comprising a breather plate having a plurality of ports and a plurality of channels, said breather plate aligned adjacent to said mold plate when said mold plate is in said filling position and opposite of said fill slot plate, whereby excess air and food matter pass through said ports and excess food matter is routed back to said food matter source via said plurality of channels.

17. A food patty molding apparatus, comprising:
    a mold plate having a plurality of patty cavities arranged in at least two rows;
    a fill slot plate adjacent to said mold plate and having a plurality of fill slots, each of said plurality of fill slots corresponding to at least one of said plurality of patty cavities;
    a breather plate having a plurality of ports and a plurality of channels, said breather plate being adjacent to said mold plate and opposite of said fill slot plate;
    a plunger operated by a hydraulic cylinder and piston rod assembly and connected to said fill slot plate, whereby actuation of said plunger and hydraulic cylinder and piston rod assembly routes food matter from a food matter source located integrally with said plunger, through said plurality of fill slots and into said plurality of patty cavities to form uniform patties, and where excess air and food matter from said patty cavities passes through said ports of said breather plate, said channels routing food matter back to said food matter source;
    a means for reciprocating said mold plate between a filling position and a discharging position; and
    a plurality of knockout cups arranged in at least two rows, whereby when said mold plate is in said discharging position, said plunger ceases to operate and said plurality of knockout cups act to discharge formed patties from said plurality of patty cavities.

18. The apparatus in claim 17 where said means for reciprocating said mold plate is operable in a low frequency range of about 65 strokes per minute.

19. The apparatus in claim 17 where said means for reciprocating said mold plate is operable in a high frequency range of about 90 to 97 strokes per minute.

20. The apparatus in claim 19 wherein said high frequency range is about 95 strokes per minute.

21. The apparatus in claim 17 further comprising a control means for controlling said means for reciprocating said mold plate and said plunger operated by said hydraulic cylinder and piston rod assembly to cyclically operate as follows: Pulse 0—no pressure from said plunger, said mold plate is in said discharge position; Pulse 199—high pressure turns on, said plunger advances, said mold plate in said filling position, filling begins; Pulse 310—high pressure turned off, said patty cavities are filled with food matter, filling stops; Pulse 355—high pressure relief is turned on, said plunger retracts; Pulse 465—high pressure relief turned off, said mold plate moves toward said discharge position; Pulse 600—no pressure to said plunger, said mold plate is in said discharge position and patties are discharged by said knockout cups.

22. The apparatus in claim 17 wherein said plurality of patty cavities form 10-1 size patties.

23. The apparatus in claim 17 wherein said plurality of fill slots are angularly oriented.

24. The apparatus in claim 17 wherein said plurality of patty cavities have an outer end, said plurality of fill slots positioned at said outer end of said plurality of patty cavities.

25. The apparatus in claim 17, wherein said hydraulic cylinder and piston rod assembly comprises a 3¼" cylinder.

* * * * *